March 12, 1946. R. W. SHOEMAKER 2,396,611
METHOD FOR THE FABRICATION OF HELICAL HEAT EXCHANGE FINS
Original Filed Aug. 1, 1940 4 Sheets-Sheet 1

Inventor
RICHARD W. SHOEMAKER
By Ralph L Chappell
Attorney

March 12, 1946.    R. W. SHOEMAKER    2,396,611
METHOD FOR THE FABRICATION OF HELICAL HEAT EXCHANGE FINS
Original Filed Aug. 1, 1940    4 Sheets-Sheet 2

Inventor
RICHARD W. SHOEMAKER
By Ralph L Chappell
Attorney

March 12, 1946. R. W. SHOEMAKER 2,396,611
METHOD FOR THE FABRICATION OF HELICAL HEAT EXCHANGE FINS
Original Filed Aug. 1, 1940 4 Sheets-Sheet 3
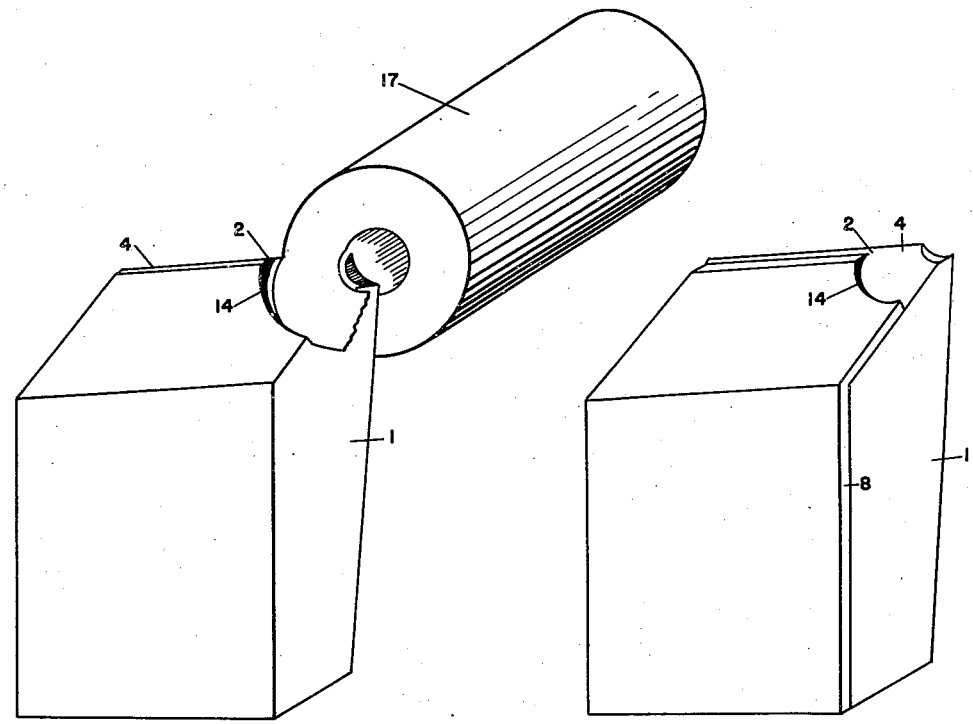
FIG. 7  FIG. 8
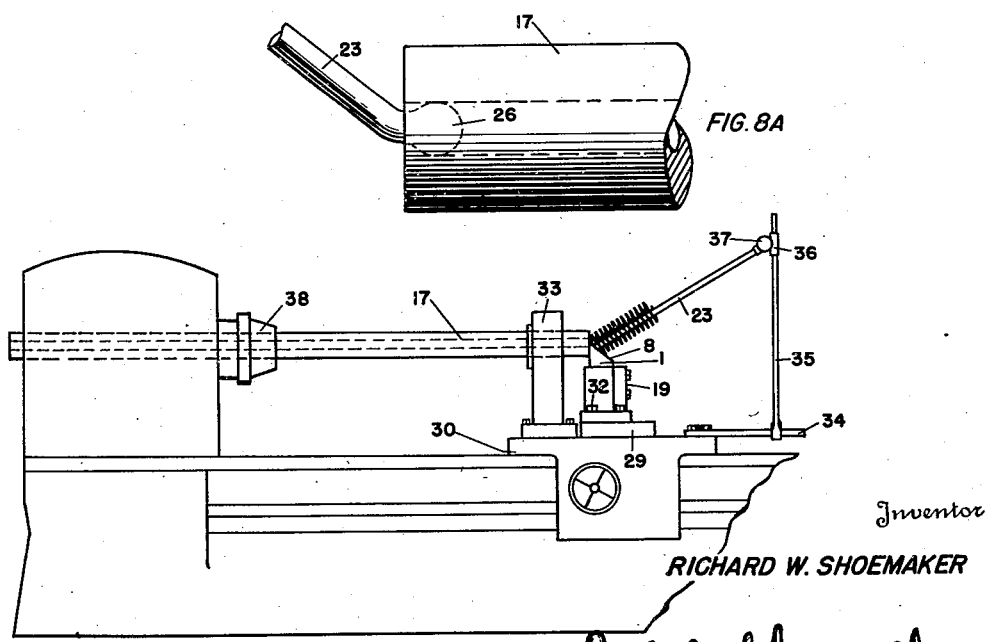
FIG. 8A
FIG. 9
Inventor
RICHARD W. SHOEMAKER
By Ralph L Chappell
Attorney March 12, 1946.   R. W. SHOEMAKER   2,396,611
METHOD FOR THE FABRICATION OF HELICAL HEAT EXCHANGE FINS
Original Filed Aug. 1, 1940   4 Sheets-Sheet 4
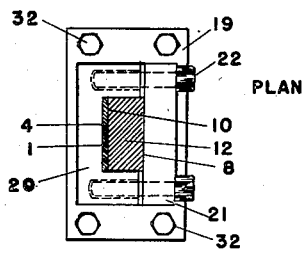
FIG. 9A
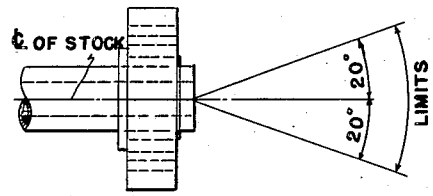
FIG. 9C
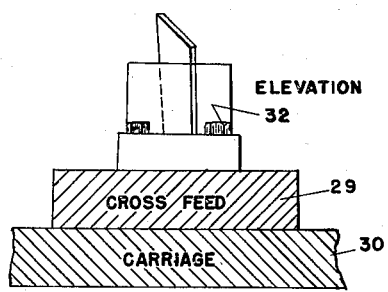
FIG. 9B
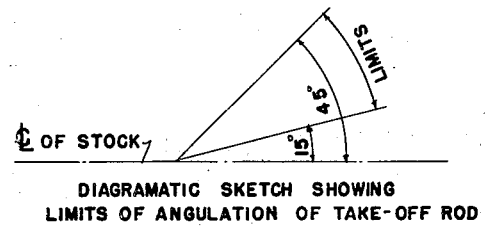
DIAGRAMATIC SKETCH SHOWING
LIMITS OF ANGULATION OF TAKE-OFF ROD
FIG. 9D
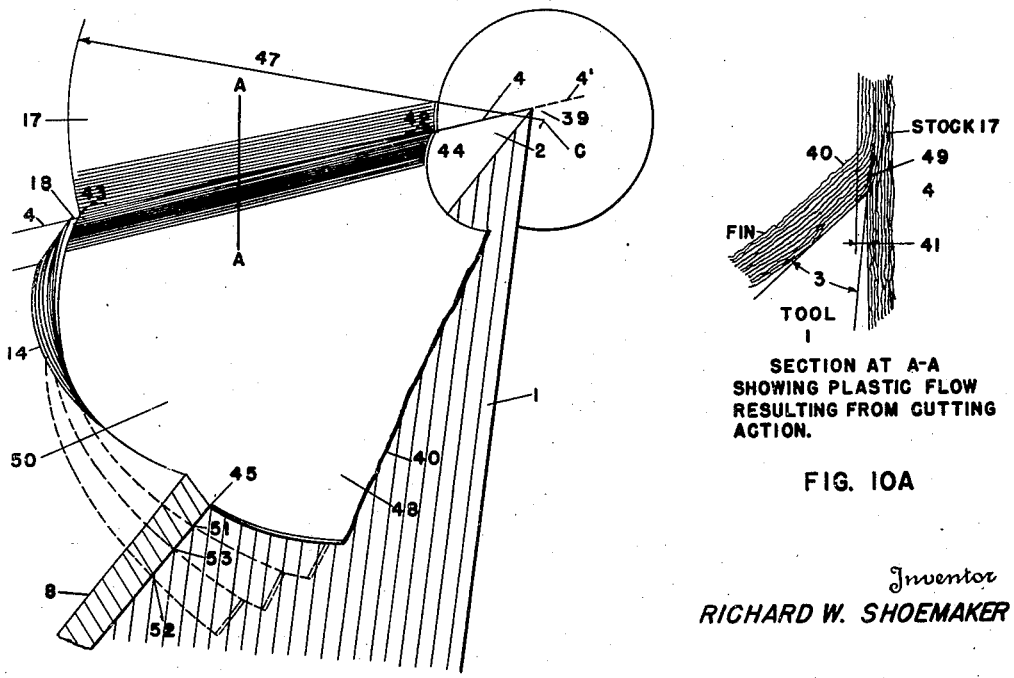
FIG. 10
SECTION AT A-A
SHOWING PLASTIC FLOW
RESULTING FROM CUTTING
ACTION.
FIG. 10A
Inventor
RICHARD W. SHOEMAKER
By Ralph Chappell
Attorney Patented Mar. 12, 1946

2,396,611

UNITED STATES PATENT OFFICE 2,396,611

METHOD FOR THE FABRICATION OF HELICAL HEAT EXCHANGE FINS

Richard W. Shoemaker, Woodbury, Conn.

Original application August 1, 1940, Serial No. 349,099, now Patent No. 2,370,265, dated February 27, 1945. Divided and this application February 8, 1944, Serial No. 521,558

7 Claims. (Cl. 29—157.3)

This application is a division of application Serial No. 349,099, filed August 1, 1940, patented February 27, 1945, as Patent No. 2,370,265.

My invention relates to a novel method for the fabrication of helical heat exchange fins, and more particularly to a method for fin fabrication which constitutes a distinct improvement over the disclosure of United States Letters Patent 2,154,430, granted April 18, 1939, and its continuations in part United States Letters Patent 2,155,395, granted April 25, 1939, and 2,162,693, granted June 20, 1939.

The method described in these above numbered patents for fabricating helical heat exchange fins essentially comprises the steps of progressively cutting a bar of metal continuously at its end and in the direction of its length to directly form by the cutting operation the desired helical heat exchange fin. While the patented method is entirely operative, it possesses the inherent disadvantage that it will not necessarily and continuously result in the production of helical heat exchange fins having commercial uniformity of predetermined dimensions to permit their ready attachment to a heat exchange element, particularly when the cutting of the fin is carried on continuously over protracted periods.

The outside and inside diameters of the severed helical fin are controlled by the dimensions of the cylindrical bar stock, speed of cutting, and location of the cutting edge, all of which are controllable and uniform. Its dimensions are also determined by the relative sharpness of the cutting tool along the line of cleavage, by the weight of the severed fin resting against the cutter and exerting a force on the metal of the fin at the line of cleavage, and by the uniformity of the bar stock from which the fin is severed. It is obvious that the sharpness of the tool will vary with its hours in service, that the bar stock will not be perfectly uniform, and that the weight of the severed fin will vary as it progressively accumulates on the takeoff rod. This gradual augmentation in frictional forces exerted on the line of severance, progressive diminution in the sharpness of the cutting tool, and unavoidable occasional hard spots in the cylindrical bar stock, all are apt to have a detrimental effect upon the helical heat exchange fin because, since they are variable, they tend to render the dimensions of the severed fin variable. It is essential to economically produce a helical fin of predetermined and uniform dimensions in order to conveniently assemble the fin with its associated heat exchange element.

These deficiencies in the prior art are effectively overcome by the present invention in which the improved method of fin fabrication contemplates the steps of progressively cutting a bar of metal continuously at its end and in the direction of its length to directly form by the cutting operation a helical heat exchange fin, confining the fin adjacent the line of severance thereof to a predetermined path of movement, and so controlling the flow of metal at the line of cleavage as to produce a fin of predetermined and uniform dimensions within the tolerances allowed by commercial practice.

While the method of the present invention may be carried out by hand or by utilizing the conventional lathe and a suitable cutting tool in conjunction with a novel guide, I prefer to practice the same with a lathe of extra substantial construction to eliminate vibration, with a headstock provided with an oversize hole to accommodate large sizes of fin stock, with a positive carriage feed instead of the customary friction devices, with a gear box to provide accurate adjustment in feed between .003 inch and .010 inch, and with a substantial follower rest of the sleeve and roller bearing type to rigidly support the rotating fin stock as close as possible to the cutting edge. Furthermore, I prefer a wedge-shaped cutting tool not supported like a cantilever in the customary tool holder, but supported firmly from all four sides and at the bottom to transmit the cutting thrust directly to the carriage of the lathe, and also mechanically connected to the follower rest to preserve the relative positions of the work being cut and the cutting edge of the tool. Furthermore, I prefer to employ a takeoff rod to support the successive convolutions of the severed fin emerging from the guide.

While the above is the preferred embodiment, the substantial inventive concept is the recessed guide positioned on the cutting tool and extending along the side rake surface thereof to form therewith a segmental passage for the reception of the helical heat exchange fin, whereby to confine the same adjacent to its line of severance to a predetermined and generally unnatural path of movement principally by engagement of a portion of the peripheral wall of the guide with the peripheral edge of the severed fin.

The successive convolutions of the helical heat exchange fin emerging from the recessed guide are supported in any suitable manner with the important result, however, that the progressively increasing frictional forces heretofore exerted by the gradually accumulating cut fin against the cutting tool now act against the exterior surface of the recessed guide. This has the highly beneficial effect of keeping the frictional forces exerted between the cutting tool and that portion of the severed fin in immediate contact therewith substantially constant during the long continued cutting operation. Thus by confining the fin adjacent its line of cleavage to a predetermined unnatural path of movement and maintaining the frictional forces acting upon said fin in its unnatural confined path of movement substantially constant, there is produced a helical heat exchange fin of substantially uniform dimensions, even though the cutting operation proceeds without intermission over protracted periods.

In the light of the foregoing it is among the several objects of my invention to provide an improved method for fabricating a cut helical heat exchange fin of predetermined and uniform dimensions; to provide an apparatus of the stated character which will permit preselection within limits of the dimensions of the fin to be severed from the bar in advance of the cutting operation; to provide a novel recessed guide for use with the cutting tool; and to provide a novel means for supporting the successive convolutions of the severed helical heat exchange fins.

Other objects and many of the attendant advantages of this invention will be readily appreciated as the same becomes better understood by referece to the following detailed description when considered in connection with the accompanying sheets of drawings, wherein there are depicted by way of example certain instrumentalities for carrying the method into effect, and in which.

Figure 1:
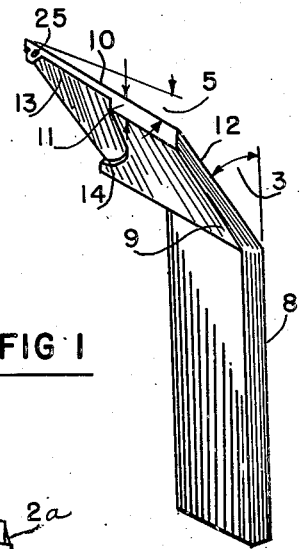
Fig. 1 is a view in perspective of one embodiment of the guide.
Figure 4:
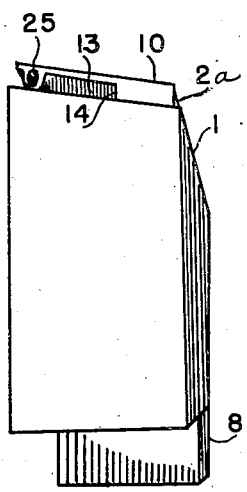
Fig. 4 shows the assembled guide and cutting tool of Fig. 3 viewed from a different angle.
Figure 3:
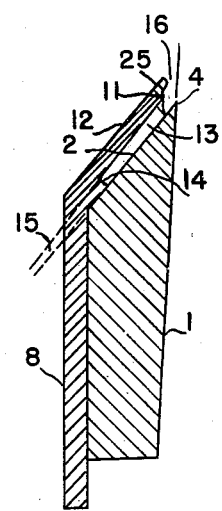
Fig. 3 is a view in section showing the recessed guide and cutting tool in juxtaposed relation.
Figure 5:
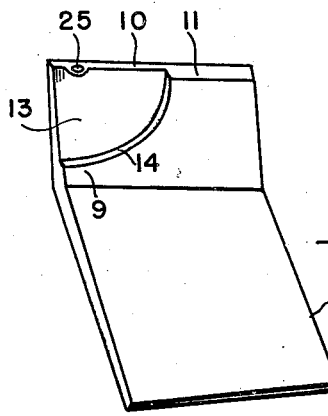
Figure 6:
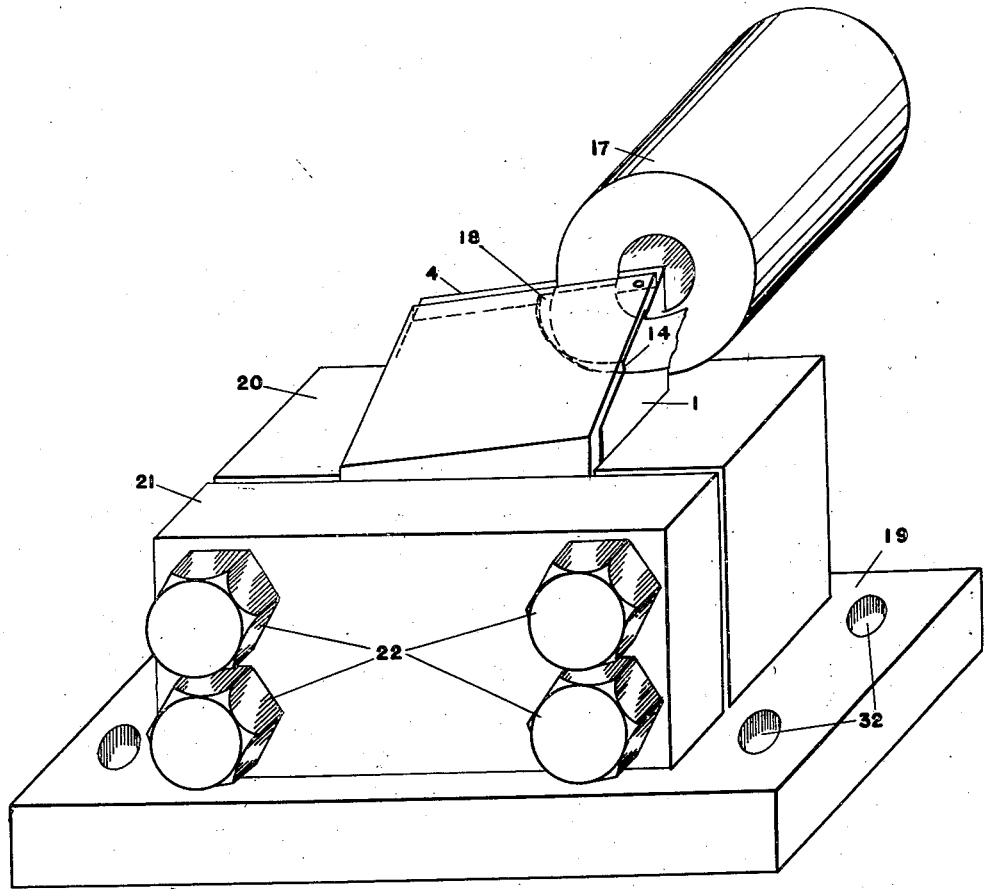
Figure 6A:
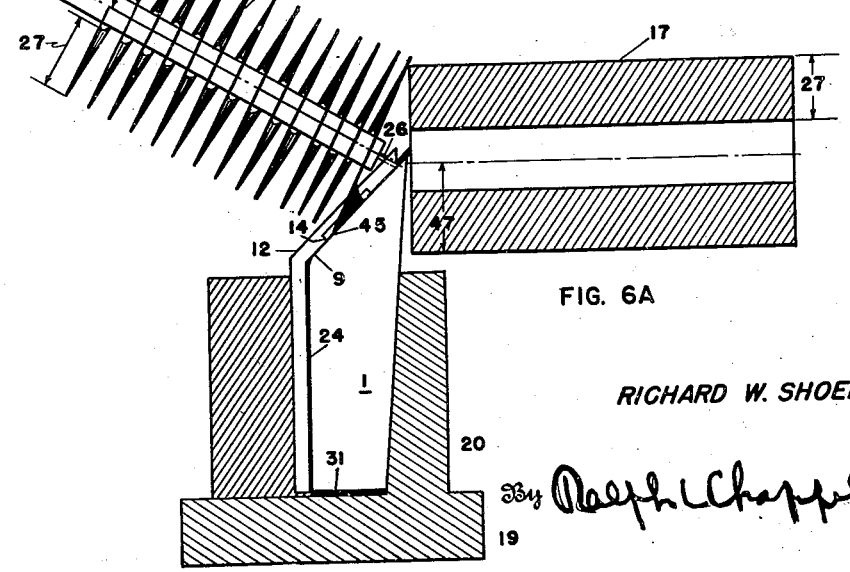

Fig. 5 further delineates perspectively the guide of Fig. 1 as seen from a different viewpoint;

Fig. 6 depicts in end elevation the assembled cutting tool and guide mounted on the tool holder and positioned in cutting relation with respect to the bar from which the helical heat exchange fin is being severed;

Fig. 6A is a sectional view of Fig. 6 in side elevation depicting the bar in cutting relation to the assembled cutting tool and guide together with a rod for supporting the convolutions of the helical fins as they emerge from the recessed guide;

Fig. 7 is an end elevation showing another embodiment of the guide in which the guide and cutting tool are integral and the rear wall surface is omitted over the arcuate recess of the guide;

Fig. 8 depicts still another embodiment of the guide in which the guide shown in Figs. 3 and 4 is depicted without the rear wall surface over the recess;

Fig. 8A shows a method of supporting the takeoff rod if the guides depicted in Figs. 7 and 3 are employed;

Fig. 9 is a view in side elevation of the assembled cutting tool and guide mounted on the special tool holder and depicting the complete apparatus in the process of fabricating the helical fin by the present invention;

Fig. 9A is a plan view showing the method of supporting the sides of the cutting tool and guide;

Fig. 9B is a side view showing the method of supporting the cutting tool and guide on the bottom from the bed of the lathe;

Fig. 9C is a diagrammatic sketch in plan to show the angular limits in the horizontal plane which the takeoff rod may assume with respect to the axis of the bar from which the helical heat exchange fin is being cut;

Fig. 9D is a side view showing these limits in the vertical plane;

Fig. 10 is an enlarged view in perspective of the cutting tool and guide as shown in Fig. 8, to illustrate the action of the cutting tool at the line of severance and the reaction of the guide at the line of severance;

Fig. 10A is a section through plane A—A on Fig. 10 to depict the flowage of metal at the line of cleavage of the cutting tool.

Before proceeding with a detailed description of the present invention, it is deemed expedient in the interest of clarity to make certain remarks concerning the bar from which the helical heat exchange fin is to be severed. While the bar as depicted in the drawings is shown longitudinally apertured with both the inner and outer surfaces thereof substantially cylindrical in contour, it is to be distinctly understood that the method of the present invention is not limited to this precise configuration since other shapes or contours may be employed where this is found desirable, provided only that either the inner or the outer surface of the bar be cylindrical in shape. The bar is longitudinally apertured to the same contour and substantially the same dimension as the outer surface of the heat exchange element which it is designed to surround.

As for the metal of the bar, it may be either ferrous or non-ferrous, the latter being preferred by reason of its greater ductility, high heat conductivity, and freedom from corrosion. Very satisfactory results, however, have been obtained from both ferrous and non-ferrous metals, and particularly from copper, brass, and aluminum in the latter group. It is also highly desirable for the metal of the bar to be as uniform and free as is commercially practicable, from non-metallic inclusions and segregations of impurities for reasons which will be apparent as the invention becomes better understood.

Figure 2:
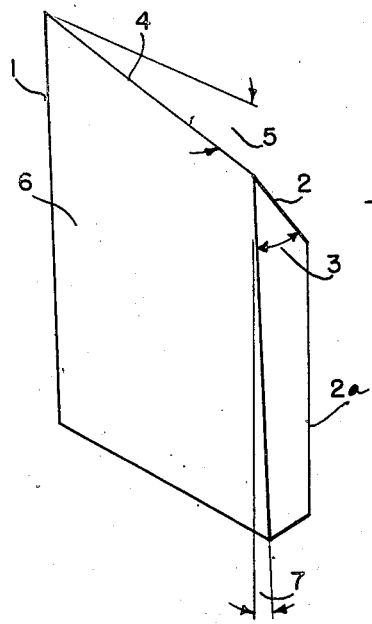
Fig. 2 is likewise a view in perspective of a cutting tool that may be employed.

Turning now to the drawings, there is shown in Fig. 2 and other figures thereof a cutting tool identified in general by the reference character 1 that may be advantageously utilized in carrying out the method of my invention. The tool is provided with a side rake surface 2 at a suitable angle 3 with respect to the vertical and a cutting edge 4 which is ground at the desired angle 5 with respect to the horizontal. The surface 6 of the tool that opposes the stock being cut is ground at a suitable angle 7 of inclination from the vertical to provide clearance and prevent frictional binding and consequent chattering. It is to be understood that the cutting tool may assume any of a number of forms within the purview of the present invention and that the specific form delineated in the drawings is given only by way of example. None of the angles given are critical, and the cutting edge 4 may be horizontal instead of cambered by the angle 5, although it has been found that the positioning of the tool can be more easily adjusted and better control of the final dimensions of the severed helical fin is obtained by the use of a tool which is cambered to give shearing action.

The guide, as disclosed more particularly in Fig. 1 and identified generally by the reference character 8, has its inner surface 9 angularly disposed in a manner to insure its substantially metal-to-metal conformity with the side rake surface 2 and vertical surface 2a of the cutting tool where the tool and guide are superimposed in the manner illustrated in Figs. 3 and 4. The angular deviation of the edge 10 of the terminal face 11 of the guide from the horizontal and that of the outer surface 12 of the guide from the vertical correspond respectively to the angular deviation of the cutting edge 4 and side rake surface 2 of the cutting tool, in consequence of which these angles 5 and 3, respectively, have been designated by similar reference characters.

The guide is provided with a recess 13, the outer peripheral wall 14 of which is preferably arcuate or curvilinear in contour and with a curvature which may be substantially the same as the outer peripheral surface of the severed helical fin and which forms with the cutting tool a passage for the reception of the severed fin which groove or passage is substantially wider than the severed fin. The peripheral wall 14 of the recess by engagement with the peripheral surface of the severed fin imparts to the fin a fixed outer uniform dimension, as well as a uniform inner dimension when the bar is longitudinally apertured since the width of the severad fin 27 in Fig. 6A is invariably equal to the wall thickness of the bar stock from which the fin is being cut, and hence this dimension has been designated by similar reference characters 27 in Fig. 6A. The depth of the recess as indicated at 15 in Fig. 3 is such as to adequately accommodate the thickness of the fin being severed.

For facilitating the entrance of the severed fin into the passageway provided therefor, the terminal face 11 of the guide is vertically machined and spaced a proper distance 16 from the cutting edge 4 of the tool. The magnitude of this spacing will vary with the task at hand and hence is not deemed critical, and it may be adjusted by a spacer plate 24 depicted in Fig. 6A of the drawings. Furthermore, that part of the peripheral wall 14 in the recess of the guide adjacent to the cutting edge of the tool should extend beyond the outer surface of the bar 17 under severance in order to provide for unimpeded lateral access of the severed fin into the passage. Similarly, the recess provides ample clearance for the inner peripheral edge of the longitudinal aperture in the bar stock 17. The amount of this clearance, indicated by the dimensional lines at 18 in Fig. 6 of the drawings, is likewise not critical and may be adjusted by the cross feed 29 (Fig. 9B) of the lathe.

The assembled tool and guide are mounted on the tool holder, identified in general by the reference character 19, as shown in Fig. 6 of the drawings. A plan view of this mounting is depicted in Fig. 9A. This tool holder includes a member 20 recessed to receive the cutting tool and a clamping plate 21 for holding the assembled tool and guide in fixed relation to the member 20 and the stock being cut. This clamping plate may be removably secured to the member 20 by any suitable means, such as bolts 22. The tool holder 19 is mounted on the conventional cross feed 29 in Figs. 9 and 9B to provide transverse movement and this cross feed 29 is in turn mounted on the carriage 30 of the lathe as shown in Figs. 9 and 9B and other figures thereof to provide for movement longitudinally of the stock 17 while it is being cut, while the stock itself is revolubly mounted in the usual and customary manner.

One notable and novel exception to customary practice is that the cutting tool is preferably held with its axis vertical instead of in the normal horizontal line so that the thrust on the tool at the cutting edge 4 is transmitted directly to the body of the lathe carriage, shown in Fig. 9, by the tool holder 19 instead of being supported by the customary tool post where the tool acts as a cantilever. The tool is also supported on four sides by the tool holder 19 and the clamping plate 21, as shown in Fig. 9A, with the result that all chatter is obviated and the tool is maintained in juxtaposed relation to the bar stock being cut.

As the convolutions of the severed fin emerge from the recess of the guide, as shown more particularly in Fig. 6A of the drawings, they proceed upwardly and over the outer surface 12 of the guide and at the same time assume a revolving position on the takeoff rod 23 which is supported at one end by means of a pin 26 inserted in an aperture 25 of the guide.

In Fig. 9 the bar stock 17 is shown revolubly mounted in a lathe having a headstock 38 with an unusually large hole to take large sizes of fins and with a steady rest 33 carrying the end of the bar stock 17 in a bushing supported in a roller bearing with the minimum possible clearance. The steady rest bearing is bolted rigidly to the lathe carriage 30 holding the stock 17 in the axis of rotation. The takeoff extension 34 is rigidly attached to the lathe carriage 30 and the take-off rod upright 35 is in turn rigidly attached to the extension. The slide 36 on the takeoff upright 35 carries one end of the takeoff rod 23 at the articulated joint 37 and the other end of the takeoff rod is supported by the hole 25 in the guide.

Fig. 9C shows the limits of angularity of the takeoff rod with the axis of rotation of the stock in the horizontal plane and Fig. 9D in the vertical plane. These angles are not critical and may be varied within wide limits by the slides and articulated joints described above. The cross feed 29, therefore, not only positions the tool and guide, but also the inner support 25 of the takeoff rod. Its location is also not critical providing the axis of the takeoff rod intersects the bar 17 within the perimeter of the longitudinal aperture therein. The lathe carriage 30 has a feed control giving great accuracy between .003 inch and .010 inch. The feed control is positive acting instead of being provided with the usual friction devices.

Having fully described the apparatus embodying the means for practicing the method of my invention, the principle involved in predetermining the dimensions of the severed helical heat exchange fins will now be set forth.

In setting up the apparatus above described, the bar stock 17 is first rigidly secured in the special headstock 38 and steady rest 33. Next, to obtain the approximate juxtaposed relation between the tool 1 and the stock 17, a washer 31 is shown in Fig. 6A which may be of any desired thickness. To obtain fine adjustments the operator can adjust the position of the cutting edge 4 by means of the customary cross feed 29 to which is secured the tool holder 19 by bolts 32 shown in Figs. 9, 9A and 9B. The angle of inclination 5 of the cutting edge 4 from the horizontal in addition to shearing permits the line of severance to be adjusted to the desired position with respect to the axis of rotation of the bar 17 by means of the cross feed plate 29. The location of the cutting edge 4 with respect to the axis of rotation of the bar stock 17 is therefore adjustable by both the washer 31 and the cross feed 29. The guide 8 has not yet been assembled in the tool holder. The cutting tool is positioned in relation to the work being cut in accordance with experience with the material to be cut, the feed to be used, the cutting speed, and the finish desired.

The feed of the lathe carriage is then set to give the thickness of cut desired remembering that the thickness of the final helical heat exchange fin designated by the reference character 40 in Figs. 10 and 10A will be as much as approximately twice the carriage feed 41. This is explained by the fact that the metal of the bar stock 17 piles up from plastic flow at the line of severance 4 as depicted in the section view 10A.

Next the lathe is started and the bar 17 is rotated in the customary manner and an initial cut of a few turns of the helical heat exchanger fin is made. If this initial shaving is not larger by a substantial amount than the outside diameter of the bar stock and the final diameter desired, the cross feed is adjusted to increase or decrease the vertical distance 39 (the cutting edge 4 being sloped) between the extended line of severance 4' and the center of rotation C of the bar stock as indicated in Fig. 10. By varying this distance the dimensions of the helical fin may be altered between narrow limits to obtain a normal outside diameter of fin when cutting freely which is substantially larger than the diameter of the bar stock 17. The final predetermined diameter of the helical heat transfer fin should be approximately that of the bar stock 17 because a larger difference between the two diameters increases the embrittlement and gives the heat transfer fin undesirable physical properties.

Having obtained an initial cut or shaving of the desired increased dimensions over those of the bar stock 17, the guide 8 is positioned with respect to the tool 1 and bar stock 17 so that there will be ample clearance 18 and so that the point 45 in Fig. 10 of the drawings on the peripheral recess wall 14 of the guide 8 will be spaced from the axis of rotation of the severed fin the distance 46 (Fig. 6A) to give the final heat exchange fin the radius 46 desired. This distance 46 is the final fin radius; and the predetermination and control of this measurement is a salient feature of my present invention.

It must be clearly understood that the distance of the point 45 from the center of rotation of the bar stock 17 will not be equal to the distance 47 unless the final outside diameter of the fin is desired exactly equal to the bar stock, and the line of severance of the cutting tool 1 intersects the axis of rotation of the bar stock 17. Since, however, this line of severance and the center from which is struck the arcuate recess wall 14 are displaced from the axis of rotation of the bar stock 17, by the distance 39, the distance of point 45 from the axis of the bar 17 is not normally equal to the radius of the severed helical heat transfer fin nor to the radius of bar stock 17. However, it is always true that the point of engagement of the fin with the recess wall at 45 is at a distance from the axis of rotation of the severed heat exchange fin which appears to be exactly equal to the desired radius 46 of the heat exchange fin.

Upon initiation of the cutting operation, the fin severed from the bar moves downwardly from the cutting edge of the tool and enters the recess or slot 13 of the guide positioned in juxtaposed relation to the cutting tool. At the upper portion of the recess the severed fin does not engage the peripheral recess wall 14 owing to the clearance 18, but as the fin moves downwardly the peripheral surface gradually approaches the recess wall and engages the same in the manner shown in Figs. 6 and 6A of the drawings. This peripheral engagement of the severed fin with the recess wall of the guide occurs just prior to the fin's emergence from the recess and imparts to the fin a predetermined inner and outer dimension, and, at the same time, has a tendency to keep the peripheral edge of the fin smooth, thus eliminating as far as possible the formation of a serrated edge.

Study of Fig. 10 will disclose the method by which the pressure exerted at 45 controls the outside and entirely dependent inside diameters of the severed fin. As the metal of the bar stock 17 approaches the line of severance 4 plastic flow occurs in the area marked 49 (Fig. 10A) and the metal is piled up on the cutter 1 to such an extent that the thickness 40 of the severed material is approximately twice that of the feed 41 and the fin material wrinkles up in a corrugated fashion, as shown by microscopic studies. It should be noted in this connection that Figs. 10 and 10A are exaggerated and enlarged representations of the plastic flow and corrugation of the metal at the line of severance. Since the fin would have an outside diameter substantially larger were it not for the restraining force exerted by the guide 14 at point 45, that force exerts a pressure in the area of plastic flow marked 42 which increases the normal size of the corrugations or wrinkles and maintains the outside diameter constant as long as any engagement or pressure whatsoever exists at 45. It is to be noted that the force exerted on the fin by the guide in the area 45 acts through a substantial lever arm. The lever consists of the severely cold worked and hardened metal of the severed fin in the area 50. Also, the metal of the fin appears to be permanently set immediately as it undergoes transition at the line of severance 4, and so much so that no change in the curvature which determines the outside and inside diameter can occur outside the area of plastic flow without undesirable effects. This area may be reduced in temperature by means of a coolant such as cutting oil. After the fin leaves the recess in the guide at point 45, therefore, no changes occur in its dimensions.

The necessity for the restrictive force at 45 in maintaining accurate and predetermined dimensions of the severed helical fin is apparent if the effect of the variable factors on the plastic flow at the line of severance 4 is studied. These variable factors, which cannot be controlled, are caused by hard spots or non-metallic segregations in the bar stock 17, unequal wear on the cutting edge 4, and constantly augmented friction between the severed fin and the side rake surface 2 of the tool. In Fig. 10 at point 53, the peripheral edge of the fin is shown as it would clear the cutting tool 1 were it permitted to assume its natural shape as it does during the preliminary cut.

If a hard spot in the stock occurs at the area 42, near the inner periphery, plastic flow will increase, the folds in the severed fin will thicken, and the linear and angular velocity of the severed fin materially decrease in the area 42. In the area 43 and along the remainder of the cutting edge 4, the thickness and velocity will remain unchanged and the fin will swing to the right to point 51 and cause a decrease in diameter from that desired. The peripheral edge of this fin, if it were free, is shown clearing the cutting tool at point 51 instead of at point 53. A relatively dull spot in the cutting edge 4 appears to have exactly the same effect if the dullness occurs in the area 42 for it is apparent that duller cutting edges will increase the size of the folds.

Conversely, if the hard spot in the bar stock 17 occurs in the outer periphery in the area 43, the fin will open and have an increased diameter if it is not prevented from so doing by the pressure at point 45 of the guide 8. The peripheral edge of this fin is shown leaving the edge of the cutting tool at point 52 instead of the point 53.

With the guide in place, however, the effect of increased plastic flow at 42 is to decrease the pressure, and at 43 to increase the pressure exerted by the fin on the recess in the guide 8 at 45, and so long as the decrease in pressure at point 45 caused by increased plastic flow at 42 does not exceed the normal force exerted at point 45 to cause the severed fin to clear the guide completely at point 45, the dimensions of the fin will continue to remain uniform even though the cutting operation proceeds without intermission over protracted periods. Excessively increased pressure at 45 caused by similar phenomena at point 43 will merely cause abnormal hardness or breakage of the severed fin.

For instance, experience has demonstrated that when using selected copper in the bar stock the normal force exerted at 45 in reducing the outside diameter a sixteenth of an inch is never completely counter-balanced by the variable forces enumerated above and the severed fin will always bear on the guide at point 45. At the same time damage to the fin will never result from excessive pressure at point 45.

It is to be clearly understood that the figure one-sixteenth of an inch is given only by way of illustration, that it is not critical, that it will vary with the material to be cut, the cutting speed, and the shape of the tool and dimensions of the severed fin.

As the cutting operation proceeds, the severed fin, which is emerging from the recess of the guide, progressively accumulates on the rod 23 and the mass of this accumulated fin exerts a force on the rod and against the outer surface 12 of the guide which is substantially parallel to the side rake surface 2 of the cutting tool. By virtue of this arrangement the force exerted against that portion of the severed fin in immediate contact with the side rake surface 2 of the cutting tool is maintained substantially constant resulting in substantially constant frictional forces acting between cutter and the severed fin in contact therewith. This variable frictional force would result in increasing the outer diameter of the severed fin as it accumulates on the rod and increase the pressure exerted by the helical fin on the peripheral wall of the guide at point 45 which has been found to give undesirable physical properties or even fracture of the severed fin.

It has been found that fins may be cut of sufficiently accurate and uniform dimensions for some commercial purposes without maintaining constant friction between the severed fin and the side rake surface 2 of the cutting tool; but the dimensions and physical properties can be predetermined with greater accuracy by the use of a guide with a rear wall surface 12 to support the severed fin. Since, however, for some purposes it is unnecessary, alternate shapes of guides without this rear wall supporting surface are shown in Figs. 7 and 8. The guide depicted in Fig. 8 has been used in Fig. 10 only for the sake of clarity, although it is not my preferred construction. The former shows a tool where the peripheral groove of the guide is integral with the tool itself and the latter shows a guide without the rear wall surface 12.

Fig. 8A shows an alternate method of supporting the takeoff rod 23 by a rounded terminal 26 within the longitudinal aperture of the bar stock 17.

It has been found that in practice no change in dimensions of the cut fin will occur during the cutting of any number of bars 17 providing all are the same material and heat treatment. If the dulling of the cutting edge proceeds too far it is necessary to substitute a new cutting tool 1 and if the new cutting tool is replaced with the guide in the same relationship to the bar stock 17 as its predecessor, the resulting fin will be of the same dimensions as before.

According to the patent statutes I have set forth the principle and mode of operation of my invention, and have illustrated and described what I now consider to represent its best embodiment. However, I desire to have it understood that within the scope of the appended claims the invention may be practiced otherwise than as specifically illustrated and described.

Having now so fully described my invention that others may therefrom make and use the same, what I claim is:

1. The method of making a helical heat exchange fin of predetermined dimensions comprising progressively cutting a bar of metal one lateral surface of which is substantially a cylinder continuously at its end and in the direction of its length to directly form by the cutting operation a helical heat exchange fin and simultaneously with the cutting operation continuously applying a force confining the fin adjacent the line of severance thereof to a predetermined path of movement whereby to produce a helical heat exchange fin of predetermined and uniform dimensions.

2. The method of making a helical heat exchange fin of predetermined dimensions comprising progressively cutting a bar of metal one lateral surface of which is substantially a cylinder continuously at its end and in the direction of its length to directly form by the cutting operation a helical heat exchange fin and simultaneously with the cutting operation continuously applying a force which confines the fin adjacent the line of severance thereof to a predetermined path of movement and maintaining the plastic flow of the metal over the line of severance constant in amount and direction whereby to produce a helical heat exchange fin of predetermined and uniform dimensions.

3. The method of making a helical heat exchange fin of predetermined dimensions comprising progressively cutting a bar of metal one lateral surface of which is substantially a cylinder continuously at its end and in the direction of its length to directly form by the cutting operation a helical heat exchange fin and simultaneously with the cutting operation continuously applying a force confining the peripheral and lateral surface of the fin adjacent the line of severance thereof to a predetermined path of movement whereby to produce a helical heat exchange fin of predetermined and uniform dimensions.

4. The method of making a helical apertured heat exchange fin of predetermined dimensions comprising progressively cutting a bar of metal one lateral surface of which is substantially a cylinder continuously at its end and in the direction of its length to directly form by the cutting operation a helical apertured heat exchange fin and simultaneously with the cutting operation continuously applying a force confining the fin adjacent the line of severance thereof to a predetermined path of movement whereby to produce a helical apertured heat exchange fin of predetermined and uniform dimensions.

5. The method of making a helical heat exchange fin of predetermined dimensions comprising progressively cutting a bar of metal continuously at its end and in the direction of its length to directly form by the cutting operation a helical heat exchange fin confining the peripheral surface of the fin adjacent the line of severance thereof to a predetermined path of movement by applying a force to the peripheral edge of the severed fin which is normally of such an amount as to at all times exceed the variable forces tending to distort the dimensions of the fin whereby to produce a helical heat exchange fin of predetermined and uniform dimensions.

6. The method of making a helical heat exchange fin of predetermined dimensions comprising progressively cutting a bar of metal continuously at its end and in the direction of its length to directly form by the cutting operation a helical heat exchange fin, confining the peripheral surface of the fin adjacent the line of severance thereof to a predetermined path of movement by a force applied to the peripheral surface of the fin, and maintaining the frictional forces acting upon the lateral surfaces of the fin in its confined path of movement substantially constant whereby to produce a helical heat exchange fin of predetermined and uniform dimensions.

7. The method of making a helical heat exchange fin of predetermined dimensions which comprises the steps of progressively cutting a substantially cylindrical bar of metal continuously at its end and in the direction of its length by the use of a cutter which is vertically and horizontally adjustable with relation to the bar being cut in order to produce a helix which tends to be at all times larger in diameter than desired, and preventing said augmentation in diameter by the use of a similarly adjustable guide which confines the metal of the bar adjacent the line of severance to a predetermined path whereby to produce a helical heat exchange fin of predetermined, uniform and controllable dimensions.

RICHARD W. SHOEMAKER.